No. 767,355. Patented August 9, 1904.

UNITED STATES PATENT OFFICE.

MITFORD C. MASSIE, OF WASHINGTON, DISTRICT OF COLUMBIA, ADMINISTRATOR OF FRITZ ACH, DECEASED, ASSIGNOR TO C. F. BOEHRINGER & SOEHNE, OF MANNHEIM-WALDHOF, GERMANY, A FIRM.

ART OF MAKING XANTHIN.

SPECIFICATION forming part of Letters Patent No. 767,355, dated August 9, 1904.

Original application filed January 6, 1903, Serial No. 138,063. Divided and this application filed January 14, 1904. Serial No. 189,048. (No specimens.)

*To all whom it may concern:*

Be it known that FRITZ ACH, deceased, late a citizen of Germany, and a resident of Mannheim, Germany, did invent new and useful Improvements in the Art of Making Xanthins; and I, MITFORD C. MASSIE, a citizen of the United States, and a resident of Washington, in the District of Columbia, the duly-constituted administrator of the estate of said FRITZ ACH, deceased, do hereby declare the following to be a full, clear, and exact description of the said invention of said decedent, such as will enable others skilled in the art to which it appertains to make and use the same, the said invention being described but not claimed in application Serial No. 138,063, filed January 6, 1903, of which this is a divisional application.

This invention relates to the art of preparing xanthin, the object of the same being to add new starting materials to those already available for this purpose, and in particular such starting materials as will lead directly or indirectly to economy in the production of this member of the purin series.

The inventor found that thioxanthin may be converted into xanthin proper by adopting proper methods of oxidation. By the reactions which he devised for this purpose the sulfuratom is eliminated, either as $SO_2$ or $H_2SO_4$, according to the selection of the oxidizing agent.

In the aforesaid application, Serial No. 138,063, filed January 6, 1903, there is broadly claimed the method of reacting on thioxanthin with a desulfurizing or, more specifically, an oxidizing reagent. Still more specifically the claims of the said application are directed to such reaction upon thioxanthin when in an acid-bath.

The present invention is directed to another specific form of such reaction—namely, the reaction of a desulfurizing or, specifically, an oxidizing agent on thioxanthin when in an alkaline bath.

This invention, moreover, consists in the action of hydrogen peroxid on thioxanthin and in such further methods, steps, and features as will appear from the specification and as will be pointed out in the claims.

In order to illustrate this invention, an example embodying what is considered the preferred form of practicing the invention will now be given.

*Oxidation of thioxanthin to xanthin in alkaline solution.*—Five parts, by weight, of thioxanthin are dissolved in one hundred and seventy parts, by weight, of water and thirty parts, by volume, of ten-times normal carbonate of soda solution ($Na_2CO_3$) in the water. The same is then cooled, and this cooled clear solution has then added to it ten parts, by volume, of a thirty-per-cent. solution of hydrogen peroxid, (corresponding to somewhat over one molecule,) the solution being cooled during the entire time during which the peroxid solution is added. The whole is then allowed to stand for several hours, and is then filtered, so as to separate the solution from a small quantity of a finely-granular precipitate, consisting of the sodium salt of the unchanged thioxanthin. The filtrate is then further treated by carefully adding to it dilute hydrochloric acid until is reacts weakly alkaline, at which stage an amorphous precipitate is thrown down in copious quantity, sulfurous acid escaping at the same time. If now the whole is boiled down after having added an excess of acetic acid, xanthin will be separated in granular form and may be then isolated and further purified by known methods.

From the above it will be noted that the reagents at starting may be either in solution or in suspension. This fact is expressed in the generic claims by the employment of the term "bath," which covers both.

The process of reacting upon a bath or, more specifically, a solution of a thioxanthin with a desulfurizing reagent, such as an oxidizing agent, is not herein broadly claimed, since this is covered in the aforesaid application, Serial No. 138,063; but

What is claimed, and desired to be secured by Letters Patent of the United States, is—

1. The process of preparing xanthin, which consists in acting on an alkaline bath containing thioxanthin with an oxidizing reagent.

2. The process which consists in acting upon a thioxanthin with hydrogen peroxid.

3. The process which consists in acting upon an alkaline solution of thioxanthin with hydrogen peroxid.

4. The process which consists in acting upon a cold alkaline solution of thioxanthin with hydrogen peroxid while keeping cool.

5. The process which consists in dissolving thioxanthin in water and sodium-hydrate solution in the proportion substantially as given, then cooling, then adding to the cold solution an aqueous solution of hydrogen peroxid in substantially the proportion and strength as given.

6. The process which consists in dissolving thioxanthin in water and sodium-hydrate solution in the proportion substantially as given, then cooling, then adding to the cold solution an aqueous solution of hydrogen peroxid in substantially the proportion and strength as given, allowing to stand, and filtering and then adding acid until the same reacts weakly alkaline.

7. The process which consists in dissolving thioxanthin in water and sodium-hydrate solution in the proportion substantially as given, then cooling, then adding to the cold solution an aqueous solution of hydrogen peroxid in substantially the proportion and strength as given, allowing to stand, and filtering and adding acid until the same reacts weakly alkaline, and, finally, boiling with excess of acid, such as acetic acid.

8. The process which consists in acting upon an alkaline solution of thioxanthin with hydrogen peroxid, then adding acid until weak alkaline reaction results.

9. The process which consists in acting upon an alkaline solution of thioxanthin with hydrogen peroxid, then adding acid until weak alkaline reaction results, and, finally, precipitating the xanthin with acid, such as acetic acid.

In testimony whereof I affix my signature in the presence of two witnesses.

MITFORD C. MASSIE,
*Administrator of the estate of Fritz Ach, deceased.*

Witnesses:
   L. T. GREIST,
   ANTON GLOETZNER, Jr.